United States Patent [19]

Kobayashi et al.

[11] Patent Number: 4,906,859

[45] Date of Patent: Mar. 6, 1990

[54] POWER SUPPLY CIRCUIT WITH SYMMETRICALLY TAPPED AUTO-TRANSFORMER

[75] Inventors: Kenji Kobayashi, Tokyo; Tetsuya Mochizuki, Yamanashi, both of Japan

[73] Assignee: NEC Corporation, Tokyo, Japan

[21] Appl. No.: 276,621

[22] Filed: Nov. 28, 1988

[30] Foreign Application Priority Data

Nov. 30, 1987 [JP] Japan ............................... 62-303552

[51] Int. Cl.⁴ ................................................ H02J 3/00

[52] U.S. Cl. ...................................... 307/17; 323/359; 336/148

[58] Field of Search ............... 323/255, 259, 262, 305, 323/340, 344, 359; 336/148, 180; 307/17

[56] References Cited

U.S. PATENT DOCUMENTS

| | | | |
|---|---|---|---|
| 1,939,319 | 12/1933 | Reiche | 323/344 |
| 3,652,923 | 3/1972 | Knudson | 336/148 |
| 3,824,449 | 7/1974 | Hase | 323/255 |
| 4,016,452 | 4/1977 | Willis | 323/305 |
| 4,100,476 | 7/1978 | Ghiringhelli | 307/17 |
| 4,309,651 | 1/1982 | Brennan | 336/148 |
| 4,591,779 | 5/1986 | Carpenter et al. | 323/340 |

*Primary Examiner*—Patrick R. Salce
*Assistant Examiner*—Jeffrey Sterrett
*Attorney, Agent, or Firm*—Laff, Whitesel, Conte & Saret

[57] ABSTRACT

An auto-transformer has first and second input terminals and first, second and third output terminals, the second output terminal being connected to a center tap of a coil and the first and third output terminals being connected to such points of the coil which are symmetrical with respect to the center tap. The first and second input terminals are connected to such points of the coil which are symmetrical with respect to the center tap. A first group of loads is coupled across the first and second output terminals and a second group of loads is coupled across the second and third output terminals. By equalizing the load currents to the first and second groups, the total current of the auto-transformer can be made significantly small.

3 Claims, 1 Drawing Sheet

POWER SUPPLY CIRCUIT WITH SYMMETRICALLY TAPPED AUTO-TRANSFORMER

BACKGROUND OF THE INVENTION

The present invention relates generally to auto-transformers, and more specifically to an auto-transformer for use in power supplies.

As is well known, an auto-transformer is formed of a coil provided with first and second terminals connected to opposite ends of the coil and a third terminal connected to a tap between the ends of the coil. AC voltage from a mains voltage source is applied across the first and second terminals and a load circuit is connected across the third terminal and one of the first and second terminals. If several circuits of relatively small amount of load are connected in parallel to the auto-transformer, the total load current is a sum of individual load currents and hence the wire gauge of the auto-transformer increases with the total load current, resulting in a costly and bulky auto-transformer.

SUMMARY OF THE INVENTION

It is therefore an object of the present invention to provide an auto-transformer which is inexpensive and compact.

This object is obtained by providing an auto-transformer with first and second input terminals for coupling to an AC voltage source and first, second and third output terminals for coupling to load circuits. The second output terminal is connected to a center tap of a coil and the first and third output terminals are connected to such points of the coil which are located substantially symmetrically with respect to the center tap. The first and second input terminals are connected to such points of the coil which are substantially located symmetrically with respect to the center tap. Loads are separated into first and second groups, the first group being coupled across the first and second output terminals and the second group being coupled across the second and third output terminals. By equalizing load currents supplied to the first and second groups, the total current of the auto-transformer can be made significantly small.

BRIEF DESCRIPTION OF THE DRAWINGS

The present invention will be described in further detail with reference to the accompanying drawings, in which.

DETAILED DESCRIPTION

Figure 1:
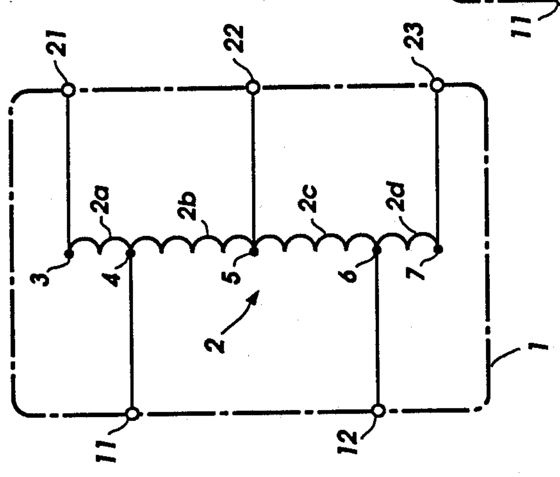
FIG. 1 is a diagram of an auto-transformer of the present invention.

An auto-transformer of the present invention, shown at 1 in FIG. 1, is constructed of a coil 2 which is segmented into a first coil section *2a*, a second coil section *2b*, a third coil section *2c* and a fourth coil section *2d*. Alternatively, each of the coil sections *2a*, *2b*, *2c*, *2d* may be constructed of an individual coil of a different gauge, with the beginning and ending points of successive coils being connected such that magnetic flux generated in each coil has the same direction of magnetic orientation. A first input terminal 11 is connected to an intermediate tap 4 located between the first and second coil sections *2a* and *2b* and a second input terminal 12 is connected to an intermediate tap 6 located between the third and fourth coil sections *2c* and *2d*. A first output terminal 21 is connected to an end tap 3 located at an end of the first coil section *2a* opposite to the tap 4. A second output terminal 22 is connected to a center tap 5 located between the coil sections *2b* and *2c* and a third output terminal 23 is connected to an end tap 7 located at one end of the fourth coil section *2d* opposite to the tap 6. The second and third coil sections *2b* and *2c* have approximately equal numbers of turns so that the intermediate taps 4 and 6 are located substantially symmetrically with respect to the center tap 5. Likewise, the first and fourth coil sections *2a* and *2d* have approximately equal numbers of turns so that the end taps 13 and 7 are located substantially symmetrically with respect to the center tap 5.

Figure 2:
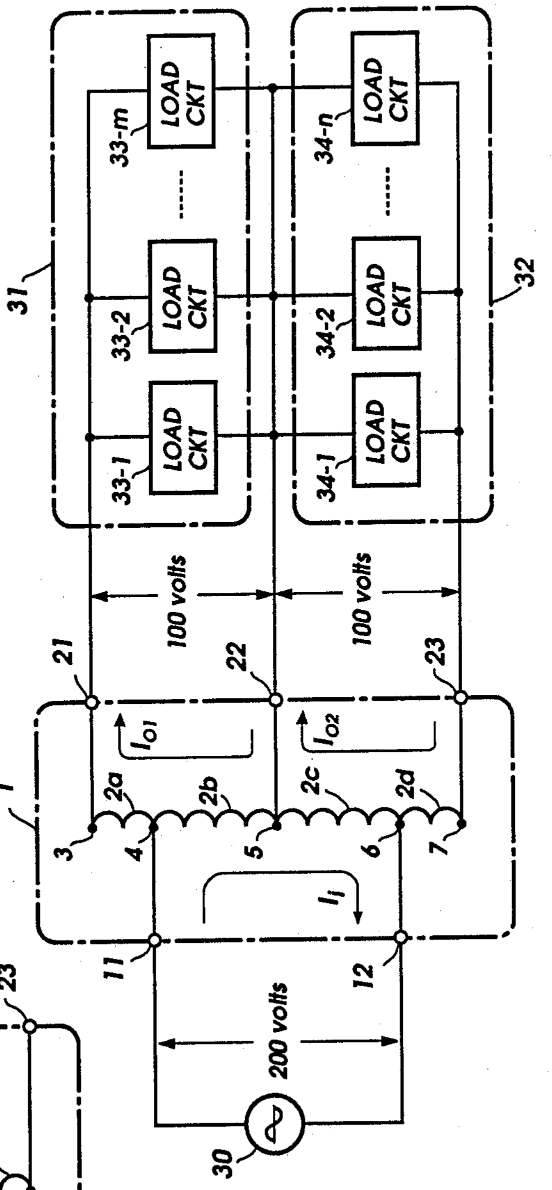
FIG. 2 is a diagram of a power supply circuit embodying the present invention.

As shown in FIG. 2, a 200-volt AC power supply 30 is connected across the first and second input terminals 11 and 12 of the auto-transformer 1. The number of turns of coil sections *2a* and *2d* is determined from a voltage drop by resistance across the output terminals 21 and 23 so that a first 100-volt potential is developed across the first and second output terminals 21 and 22 to which a first load 31 is connected and a second 100-volt potential is developed across the second and third output terminals 22 and 23 to which a second load 32 is connected. Load 31 includes a group of parallel-connected circuits 33-*l* through 33-*m* and load 32 is likewise formed of a group of parallel-connected circuits 34-*l* through 34-*n*.

If input current $I_i$ flows between the input terminals 11 and 12, load current $I_{o1}$ flows between the output terminals 21 and 22 in a direction opposite to the direction of the input current and load current $I_{o2}$ flows between the output terminals 22 and 23 in a direction opposite to the direction of the input current, then the amount of current that flows through the second coil section *2b* is equal to the difference between currents $I_i$ and $I_{o1}$ and the amount of current flowing through the third coil section *2c* is equal to the difference between currents $I_i$ and $I_{o2}$. In addition, the amount of current flowing through the first coil section *2a* is equal to the total of load currents supplied to loads 33-*l* to 33-*m* and the amount of current flowing through the fourth coil section *2d* is equal to the total of load currents supplied to loads 34-*l* to 34-*n*. If the load currents $I_{o1}$ and $I_{o2}$ are made substantially equal to each other, the differential currents flowing through the second and third coil sections *2b* and *2c* can be reduced substantially to zero.

In a practical embodiment of the present invention, if the voltage drop across the coil 2 is small, the total number of turns of the coil sections *2b* and *2c* between terminals 11 and 12 can be substantially made equal to the total number of turns of the coil 2 between terminals 21 and 23. Therefore, the first and fourth coil sections *2a* and *2d* can be made of a few turns of coil and hence very small current flows through the auto-transformer of the present invention, allowing it to be constructed of small gauge wire.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A power supply circuit comprising:

a coiled structure having first, second, third and fourth taps, and a center tap, said first and second taps being substantially symmetrically located with respect to said center tap and inwardly along said coiled structure from said third and fourth taps, and said third and fourth taps being substantially symmetrically located with respect to said center tap and located at opposite ends of said coiled structure;

first and second input terminals connected to said first and second taps for supplying an input current through a portion of said coiled structure which is between said first and second taps;

a first output terminal connected to said center tap, and second and third output terminals connected respectively to said third and fourth taps;

a first load circuit connected between said first and second output terminals so that a first load current flows through a portion of said coiled structure between said center tap and said third tap in a direction opposite to the direction of said input current; and a second load circuit connected between said first and third output terminals, said second load circuit having substantially the same impedance as said first load circuit to cause a second load current of substantially the same magnitude as said first load current to flow through a portion of said coiled structure between said fourth tap and said center tap in a direction opposite to the direction of said input current.

2. A power supply circuit comprising:

a coil having first, second, third and fourth coil sections, said first and fourth coil sections having substantially an equal numbers of turns, and said second and third coil sections having substantially an equal numbers of turns;

a first input terminal connected to a junction between said first and second coil sections, and a second input terminal connected to a junction between said third and fourth coil sections for supplying an input current through said second and third coil sections;

a first output terminal connected to a junction between said second and third coil sections, a second output terminal connected to a first end of said coil, and a third output terminal connected to a second end of said coil which is opposite to said first end;

a first load circuit connected between said first and second output terminals so that a first load current flows through said first and second coil sections in a direction which is opposite to the direction of said input current; and a second load circuit connected between said first and third output terminals, said second load circuit having substantially the same impedance as said first load circuit to cause a second load current of substantially the same magnitude as said first load current to flow through said third and fourth coil sections in a direction opposite to the direction of said input current.

3. A power supply circuit comprising:

a series of first, second, third and fourth coils, beginning and ending points of each of said first, second, third and fourth coils, being interconnected so that an equally oriented magnetic flux is generated in each of said coils, said first and fourth coils having substantially an equal numbers of turns, and said second and third coils having substantially an equal numbers of turns;

a first input terminal connected to a tap between said first and second coils, a second input terminal connected to a tap between said third and fourth coils for supplying an input current through said second and third coils;

a first output terminal connected to a tap between said second and third coils, a second output terminal connected to a first end of said series of coils, and a third output terminal connected to a second end of said series of coils which is opposite to said first end;

a first load circuit connected between said first and second output terminals so that a first load current flows through said first and second coils in a direction which is opposite to the direction of said input current; and a second load circuit connected between said first and third output terminals, said second load circuit having substantially the same impedance as said first load circuit to cause a second load current of substantially the same magnitude as said first load current to flow through said third and fourth coils in a direction which is opposite to the direction of said input current.

* * * * *